US012619141B2

(12) United States Patent　　(10) Patent No.:　US 12,619,141 B2
Lu　　　　　　　　　　　　　　　　(45) Date of Patent:　　　May 5, 2026

(54) IMAGE PROJECTION METHOD FOR VIRTUAL TOUR

(71) Applicant: CUPOLA360 INC., Hsinchu City (TW)

(72) Inventor: Chung-Yen Lu, Hsinchu City (TW)

(73) Assignee: CUPOLA360 INC., Hsinchu City (TW)

( * ) Notice: Subject to any disclaimer, the term of this patent is extended or adjusted under 35 U.S.C. 154(b) by 251 days.

(21) Appl. No.: 18/295,732

(22) Filed: Apr. 4, 2023

(65) Prior Publication Data

US 2024/0337915 A1　　Oct. 10, 2024

(51) Int. Cl.
　G03B 37/00　　　(2021.01)
　G03B 17/54　　　(2021.01)
　G03B 21/32　　　(2006.01)
　H04N 23/695　　(2023.01)

(52) U.S. Cl.
　CPC ............. G03B 37/00 (2013.01); G03B 17/54 (2013.01); G03B 21/32 (2013.01); H04N 23/695 (2023.01)

(58) Field of Classification Search
　CPC ........ G03B 37/00; G03B 17/54; G03B 21/32; H04N 23/695; H04N 23/698
　See application file for complete search history.

(56) References Cited

U.S. PATENT DOCUMENTS

2024/0312136 A1 *　9/2024　Narayana ................... G06T 7/73

FOREIGN PATENT DOCUMENTS

CA　　2941469 C　*　5/2018　........... H04N 23/631

OTHER PUBLICATIONS

JP2024-97267 (Year: 2024).*

* cited by examiner

*Primary Examiner* — Joseph W Becker
(74) *Attorney, Agent, or Firm* — Muncy, Geissler, Olds & Lowe, P.C.

(57)　　　　　　ABSTRACT

An image projection method for a virtual tour system is disclosed. The virtual tour system receives a panorama image derived from a panorama camera and comprises a local device. The local device comprises a display unit. The method comprises steps of: obtaining a distance factor according to coordinates of the panorama camera and a viewer in real world space; obtaining mapping coordinates of a viewpoint related to the viewer in unit sphere space according to the distance factor and the coordinates of the viewer in real world space; and, forming a view image to be displayed by the display unit according to the mapping coordinates of the viewpoint.

17 Claims, 13 Drawing Sheets

FIG. 1

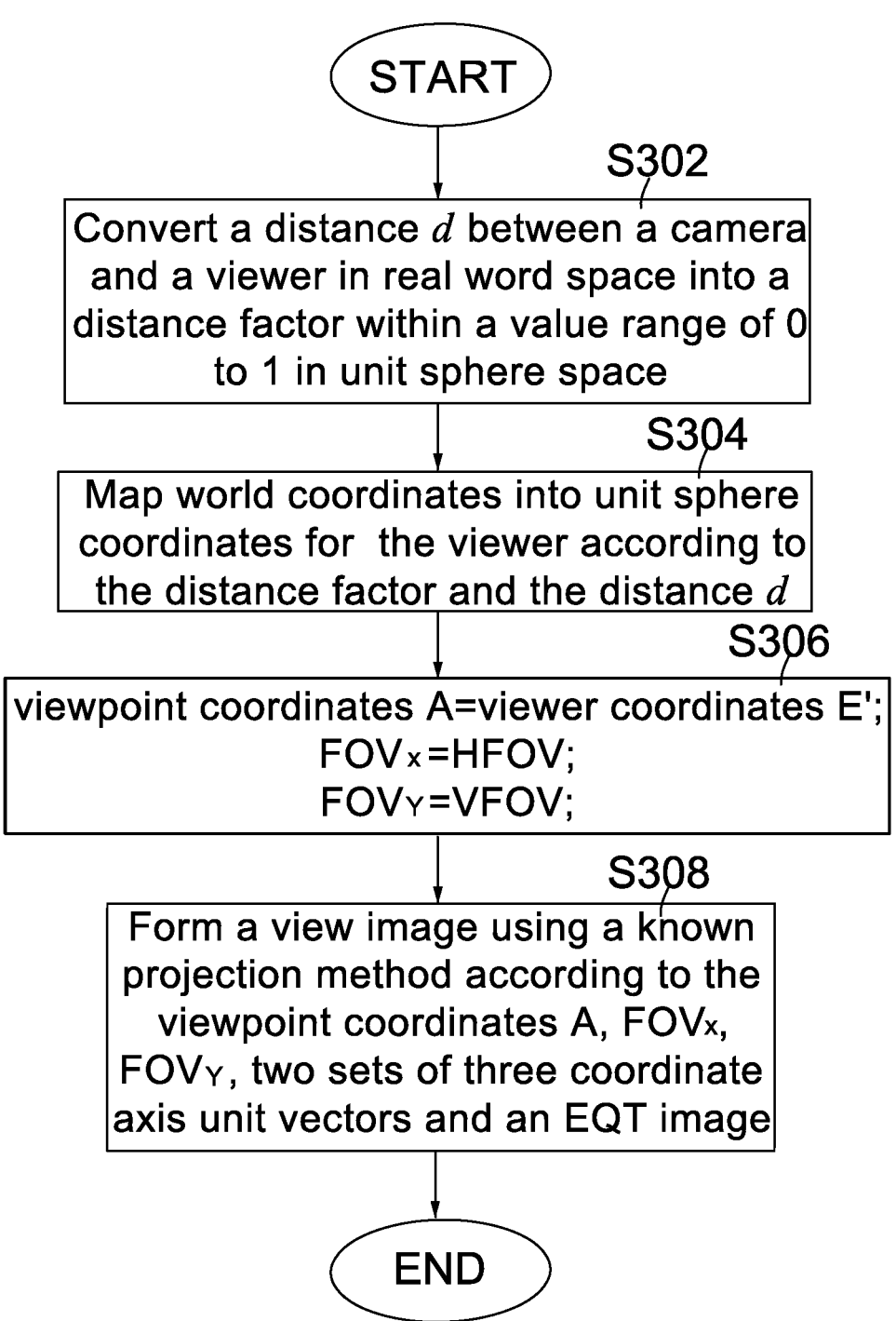

START

S302

Convert a distance $d$ between a camera and a viewer in real word space into a distance factor within a value range of 0 to 1 in unit sphere space

S304

Map world coordinates into unit sphere coordinates for the viewer according to the distance factor and the distance $d$

S306 viewpoint coordinates A=viewer coordinates E';
$FOV_x$=HFOV;
$FOV_Y$=VFOV;

S308

Form a view image using a known projection method according to the viewpoint coordinates A, $FOV_x$, $FOV_Y$, two sets of three coordinate axis unit vectors and an EQT image

END

FIG. 3A

Rectilinear Projection real world space

□ viewer (E)

⊗ 360-degree
camera (O)

IMAGE PROJECTION METHOD FOR VIRTUAL TOUR

BACKGROUND OF THE INVENTION

Field of the Invention

The invention relates to virtual tour, and more particularly, to image projection method for virtual tour.

Description of the Related Art

A virtual tour is a simulation of an existing position, usually composed of a sequence of videos, still images or 360-degree images. It may also use other multimedia elements such as sound effects, music, narration, text and floor map. It is designed to provide a realistic representation of a position that can be explored remotely from a computer, tablet or mobile device, without the need for physical travel. It is a powerful tool for marketing and promoting businesses, products, and services, and can also serve as an educational resource for students and researchers.

FIG. 1 is an exemplary diagram showing a viewer roams an exhibition room with three partitions and four panorama cameras. Conventionally, virtual tours are created by two ways: three-dimensional (3D) modeling and panoramic images. (1) 3D modeling: involve a capture of a real-world position and the conversion of the capture into a 3D model so that each pixel in panoramic images has a corresponding depth value. As positions and view directions of a user/ viewer 12 may change at will, view images for the viewer change accordingly. However, the downside of reconstructing the 3D modeling is high cost and difficult to maintain. (2) Panoramic images: all view images for a viewer 12 are formed based on a "fixed" point, i.e., the fixed position of a panorama camera in an independent space, such as the fixed position of a panorama camera 11-1 in an independent partition-1 in FIG. 1. Panoramic roaming (i.e., virtual tours are created by panoramic images) is widely used in digital exhibitions and street view maps because of its characteristics of low hardware requirements, good compatibility and strong sense of reality.

Accordingly, what is needed is a new image projection method for a virtual tour system to form view images according to different positions, different field of views (FOVs) and different view directions of viewers, without reconstructing any 3D model/layout.

SUMMARY OF THE INVENTION

In view of the above-mentioned problems, an object of the invention is to provide an image projection method for a virtual tour system, thereby to form view images according to different positions, different FOVs and different view directions (e.g., different view direction vectors) of viewers, without reconstructing any 3D model/layout.

One embodiment of the invention provides an image projection method for a virtual tour system receiving a panorama image derived from a panorama camera and comprising a local device. The local device comprises a display unit. The method comprises steps of: obtaining a distance factor according to coordinates of the panorama camera and a viewer in real world space; obtaining mapping coordinates of a viewpoint related to the viewer in unit sphere space according to the distance factor and the coordinates of the viewer in real world space; and, forming a view image to be displayed by the display unit according to the mapping coordinates of the viewpoint.

Another embodiment of the invention provides an image projection method for a virtual tour system receiving a panorama image derived from a panorama camera and comprising a local device. The local device comprises a display unit. The method comprises steps of: obtaining a distance factor, a field of view (FOV) factor and default coordinates of a viewpoint according to a view direction vector and coordinates of the panorama camera and a viewer in real world space; obtaining mapping coordinates of the viewpoint in unit sphere space according to the distance factor and the default coordinates of the viewpoint; modifying a default FOV according to the FOV factor to obtain a current FOV; and, forming a view image to be displayed by the display unit according to the mapping coordinates and the current FOV. Here, the view direction vector is orthogonal to the view image.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exemplary diagram showing a viewer roams an exhibition room with three partitions and four panorama cameras.

FIG. 3A is a flow chart of image projection method for virtual tour according to an embodiment of the invention.

DETAILED DESCRIPTION OF THE INVENTION

Figure 2A:
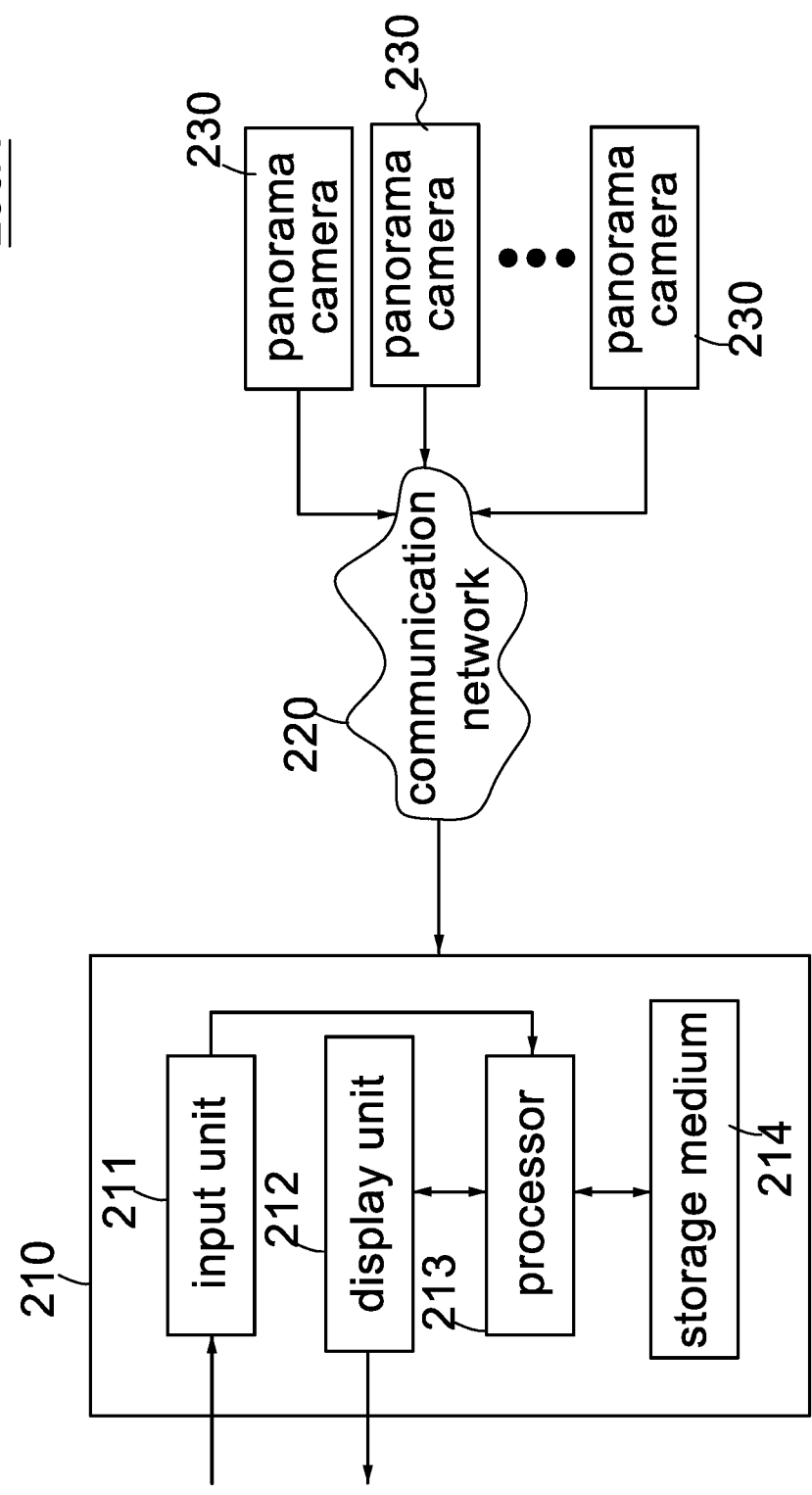
FIG. 2A is a block diagram of a virtual tour system with a real-time architecture according to a first embodiment of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

FIG. 2A is a block diagram of a virtual tour system with a real-time architecture according to a first embodiment of the invention. Referring to FIG. 2A, a local device 210 executing a browser is connected to multiple panorama cameras 230 through a communication network 220, such as Internet or computer networks. Each panorama camera 230 captures a view with up to 360-degree horizontal field of view (FOV) and up to 180-degree vertical FOV to generate multiple camera images, blends the multiple camera images into a panoramic image using any known algorithms or approaches, encodes the panoramic image into an encoded video bitstream using any known encoder, such as H.264 or MPEG 2/4, and finally transmits the encoded video bitstream to the local device 210 through the communication network 220. The panorama camera 230 includes, but is not limited to, a 360-degree camera and a wide-angle camera.

The local device 210 receives multiple encoded video bitstreams from multiple panorama cameras 230 through the communication network 220, decodes the multiple encoded video bitstreams into multiple decoded panoramic images and then stores the multiple decoded panoramic images in a storage medium 214. Based on the multiple decoded panoramic images, the local device 210 generates a current view image in real time in response to user movements or actions on the browser or the input unit 211 (will be described in FIG. 6). In addition to the multiple decoded panoramic images, the storage medium 214 stores multiple program codes/instructions to be executed by the processor 213 to perform all the steps of image projection methods in FIGS. 3A and 5A and an image processing method of FIG. 6 (as will be described in greater detail below). The local device 210 includes, but is not limited to, a personal computer, a tablet/laptop computer, a mobile device, a three-degree-of-freedom (3-DoF) virtual reality (VR) headset and a 6-DoF VR headset. The local device 210 includes an input unit 211, a display unit 212, a processor 213 and a storage medium 214. The input unit 211 includes, but is not limited to, a mouse, a keyboard, a touchpad, a touch panel and any combination thereof.

Figure 2B:
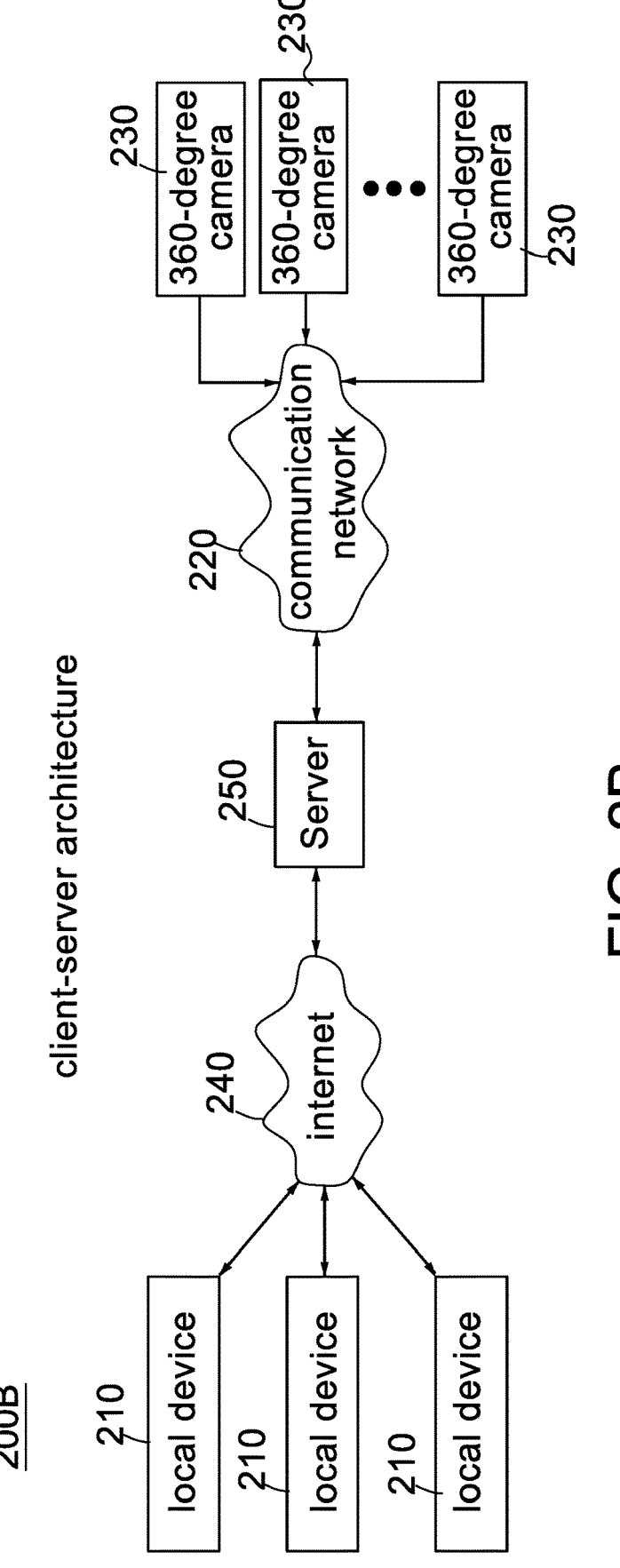
FIG. 2B is a block diagram of a virtual tour system with a server-client architecture according to a second embodiment of the invention.

FIG. 2B is a block diagram of a virtual tour system with a server-client architecture according to a second embodiment of the invention. In one embodiment, referring to FIG. 2B, the server 250 stores multiple encoded video bitstreams from the multiple panorama cameras 230 through the communication network 220 once. The server 250 contains the necessary programs to provide multiple encoded video bitstreams and interact with a user interface displayed on the local device 210 in a web browser. Each local device 210 in FIG. 2B executes the web browser and performs the operations similar to those described in FIG. 2A, except that each local device 210 in FIG. 2B is connected to the server 250 through internet 240 and receives the multiple encoded video bitstreams from the server 250. FIGS. 2A-2B are simplified illustration and numerous other arrangements of servers and networks can readily be utilized.

Throughout the specification and claims, the following terms take the meanings explicitly associated herein, unless the context clearly dictates otherwise. The term "view image (or display image or screen image)" refers to a two-dimensional (2D) image to be displayed by a display unit 212 of a local device 210 in a virtual tour system 200A/B. The term "view direction vector" refers to a vector orthogonal to an image plane and pointing to the front of a viewer. In 3D computer graphics, the term "image plane" refers to a plane in the real world which is identified with the plane of the display unit 212 used to view the image that is being rendered. If one makes the analogy of taking a photograph to rendering a 3D image, the surface of the film is the image plane. In this case, the viewing transformation is a projection that maps the real world onto the image plane. A rectangular region of the image plane, called "view image" in this application, maps to the display unit 212. This establishes the mapping between pixels on the display unit 212 and points in the 3D world. Please note that the view image is part of the image plane.

A feature of the invention is to form view images for virtual tour according to different positions, different view directions (e.g., different view direction vectors) and different FOVs of a viewer, without reconstructing any 3D model/layout. Thus, when the viewer changes his positions or view directions, the view images change accordingly. Another feature of the invention is to map coordinates in real world coordinate system into coordinates in unit sphere coordinate system for both the panorama camera and the viewer, in order to make good use of panoramic images as texture images. In comparison with the conventional way One (i.e., 3D modeling) to create the virtual tours, the invention eliminates the need to reconstruct any 3D model/layout and thus has a lower system complexity and cost. In comparison with the conventional way Two (i.e., panoramic images) to create the virtual tours, the invention provides more degrees of freedom for a viewer to watch because view images can be formed based on different positions, different view directions and different FOVs of a viewer.

In mathematics, a unit sphere is simply a sphere of radius one around a given center. More generally, it is the set of points of distance 1 from a fixed central point, where different norms can be used as general notions of "distance". A unit ball is the closed set of points of distance less than or equal to 1 from a fixed central point. Usually, the center is at the origin of the space, so one speaks of "the unit ball" or "the unit sphere".

The panoramic image includes, but is not limited to, an equirectangular (EQT) panoramic image, a cube map and a modified cube map. For purposes of clarity and ease of description, hereinafter, the following examples and embodiments will be described with the equirectangular (EQT) panoramic image.

Figure 3B:
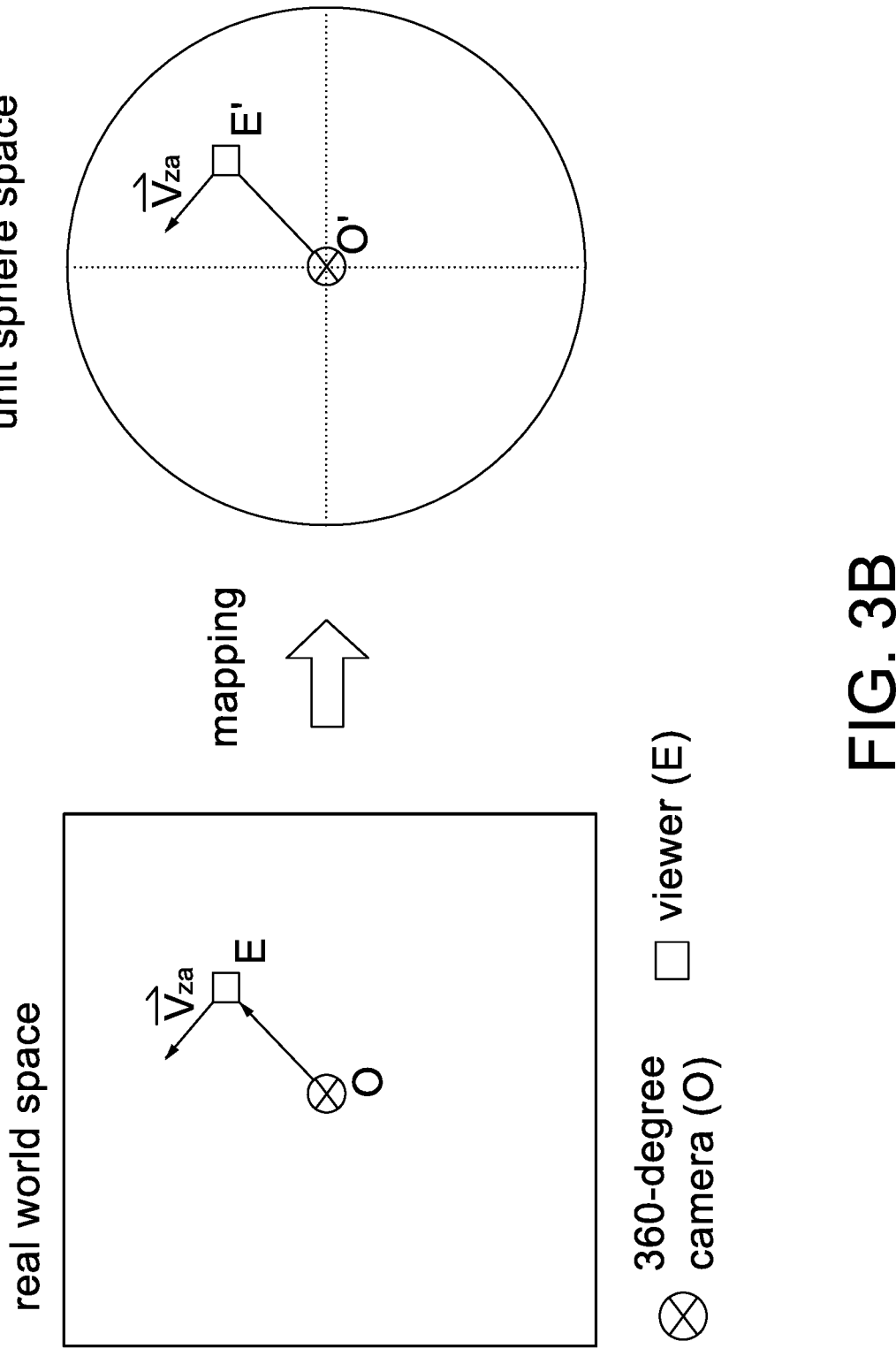
FIG. 3B shows a first mapping relationship between a real word space and a unit sphere space for a panorama camera and a viewer.

FIG. 3A is a flow chart of image projection method for virtual tour according to an embodiment of the invention. Hereinafter, all steps of the image projection method (performed by the processor 213) are described with reference to FIGS. 3A-3D. It is assumed that (1) there are a panorama camera and a viewer in a room/space; (2) the viewer wears or carries a local device 210; (3) a storage medium 214 of the local device 210 stores a decoded EQT panoramic image derived from the panorama camera; and (4) a display unit 212 of the local device 210 is ready to display a view image once the final step S308 is completed.

5

Figures 3C, 3D:
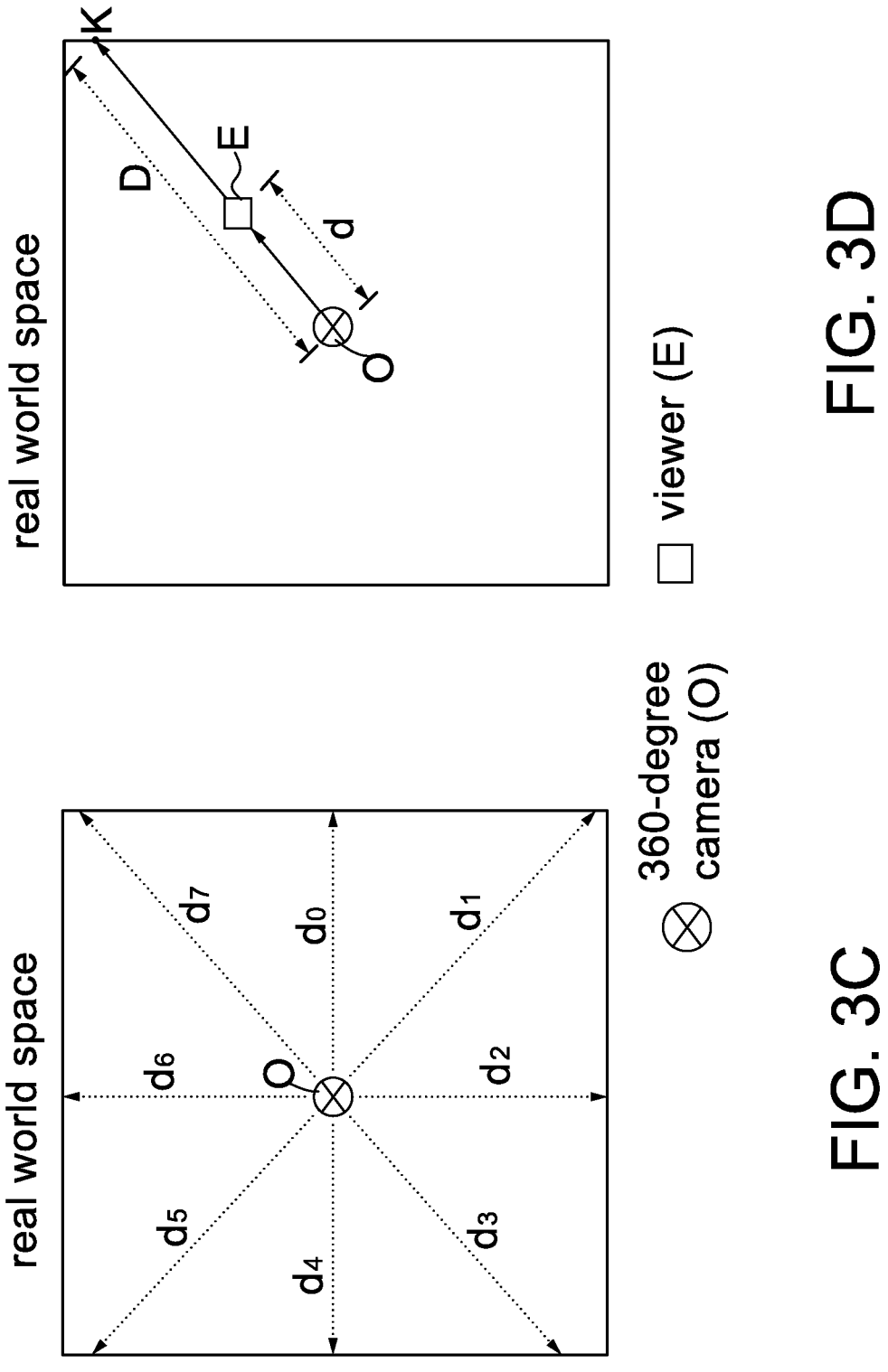
FIG. 3C is an example showing different distances of walls from the panorama camera in a space.
FIG. 3D is an example showing different distances of a viewer and a point K from the panorama camera in a room.

Step S302: Convert a distance between the panorama camera and the viewer in real world space into a distance factor $\alpha$ within a value range of 0 to 1 in unit sphere space. For example, as shown on the left side of FIG. 3B, calculate the distance d between the panorama camera O and the viewer E according to their coordinates $O(x_0, y_0, z_0)$ and $E(x_e, y_e, z_e)$ in real world coordinate system by: $d=\|\overrightarrow{OE}\|$. Then, calculate the distance factor $\alpha$ according to the distance d by using one of the following the approaches A1~A3. For Approach A1, calculate the distance factor $\alpha=f(d)=\rho\times(1-e^{-d})$, where $0<\rho<1$. For Approach A2, calculate an average distance Rad from the camera O to the multiple walls in a space/room and then calculate the distance factor $\alpha=f(d)=d/\text{Rad}$. For example, $$Rad = \sqrt[3]{\left(\sum_{i=0}^{i=7} d_i^3\right)/8},$$

where $d_i$ indicates distances of different walls from the camera O in a room of FIG. 3C. For Approach A3, calculate a distance $D=\|\overrightarrow{OK}\|$ from the camera O to a point K on the right wall of the room in FIG. 3D and then calculate the distance factor $\alpha=f(d)=d/D$, where vectors $\overrightarrow{OE}$ and $\overrightarrow{OK}$ have the same direction. Please note that Approaches A2~A3 impose the upper limitation on the distance factor $\alpha$. That is, if the distance factor $\alpha$ is greater than a maximum value of aHigh, then $\alpha=$aHigh.

Step S: Map coordinates in real world coordinate system into coordinates in unit sphere coordinate system for the camera O and the viewer E according to the distance d and the distance factor $\alpha$. Converting coordinates $O(x_0, y_0, z_0)$ of the camera in real world coordinate system into the origin $O'(0, 0, 0)$ in unit sphere coordinate system is prerequisite for mapping the coordinates. Then, the coordinates E' in unit sphere coordinate system corresponding to the viewer E are calculated by the equation: $\overrightarrow{O'E}=O'+\alpha\times\overrightarrow{OE}/d$.

Step S306: Set coordinates of a viewpoint A in unit sphere coordinate system to the viewer coordinates E', a horizontal field of view ($FOV_x$) to a fixed HFOV value, a vertical $FOV(FOV_Y)$ to a fixed VFOV value. In other words, the coordinates of the viewpoint A are equal to the viewer coordinates E' in unit sphere coordinate system; $FOV_x=$HFOV; $FOV_y=$VFOV.

Step S308: Form a view image using a known projection method based on the coordinates of the viewpoint A, the $FOV_x$ value, the $FOV_Y$ value, three coordinate axis unit vectors $(\overrightarrow{V_{xa}},\overrightarrow{V_{ya}},\overrightarrow{V_{za}})$, three coordinate axis unit vectors $(\overrightarrow{V_{xc}}, \overrightarrow{V_{yc}},\overrightarrow{V_{zc}})$ and the decoded EQT panoramic image. Here, three coordinate axis unit vectors $(\overrightarrow{V_{xc}},\overrightarrow{V_{yc}},\overrightarrow{V_{zc}})$ define the orientation of the panorama camera O, the three coordinate axis unit vectors $(\overrightarrow{V_{xa}},\overrightarrow{V_{ya}},\overrightarrow{V_{za}})$ define the orientation of the image plane containing the view image in FIGS. 4A-4B. The known projection method includes, but is not limited to, rectilinear projection and cylindrical projection. For purpose of clarity and ease of description, the step S308 will be described in terms of rectilinear projection. However, rectilinear projection is only utilized as embodiments and not limitations of the invention. In actual implementations, any other known projection methods can be used and this also falls in the scope of the invention.

6

Figure 4A:
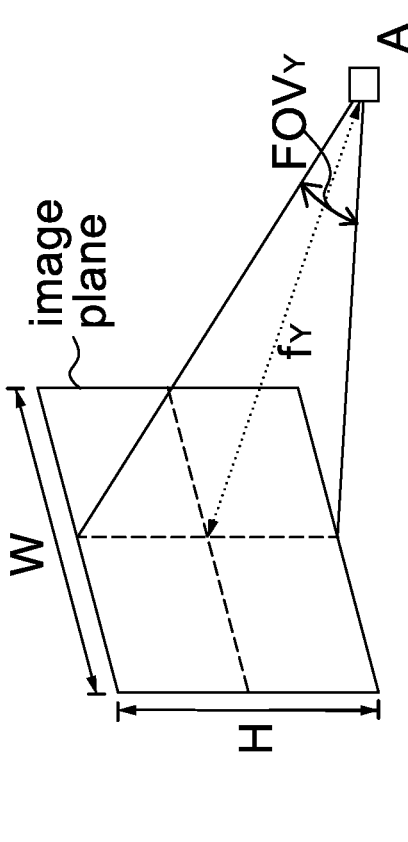
FIG. 4A shows a Rectilinear projection representation.
Figure 4A:
Figure 4A:
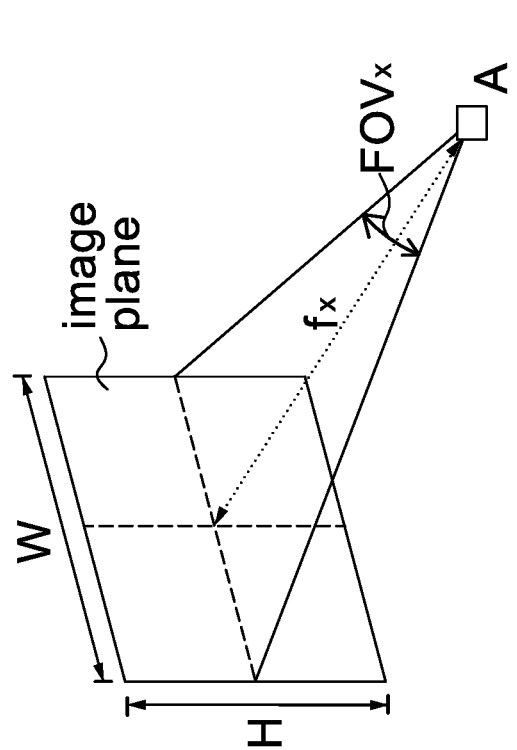

Referring to FIG. 4A, according to conventional rectilinear projection, rectilinear projection functions are given as:

$$W/2 = f_x \times \tan(FOV_X/2); // \qquad \text{equation (1a)}$$

$$H/2 = f_Y \times \tan(FOV_Y/2); // \qquad \text{equation (1b)}$$

According to equation (1a), calculate $$f_x = W/(2 \times \tan(FOV_x/2)). \qquad \text{equation (2a)}$$

According to equation (1b), calculate $$f_y = H/(2 \times \tan(FOV_y/2)) \qquad \text{equation (2b)}$$

Figure 4B:
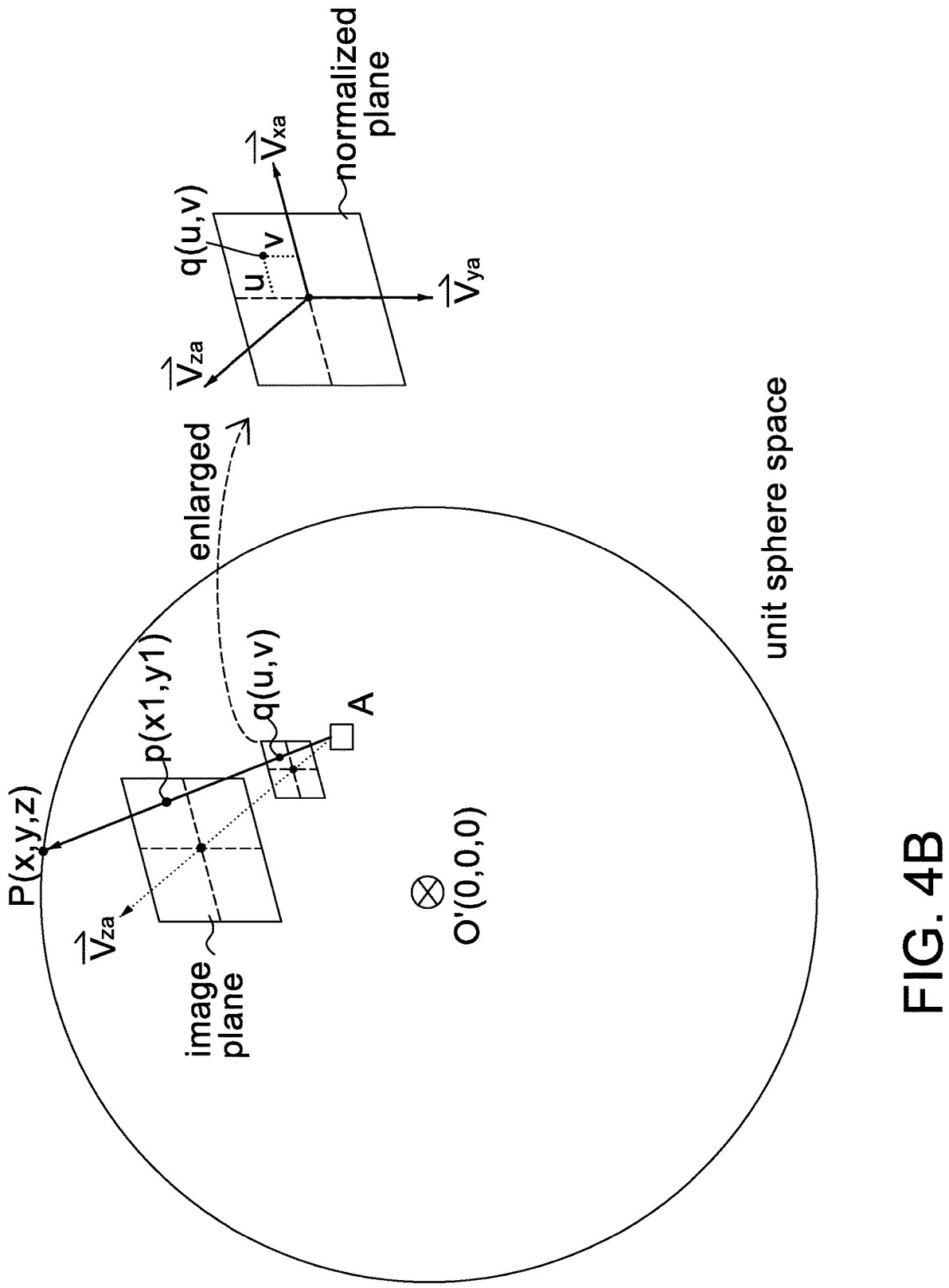
FIGS. 4B and 4C show an example of imaging principle according to the invention.

Here, $f_x$ and $f_Y$ are the distances between the viewpoint A and the center of the image plane, and W and H denote the width and the height of each view image. For a pixel p(x1,y1) on the view image as shown in FIG. 4B, two factors (u and v) of two coordinate axis unit vectors $(\overrightarrow{V_{xa}},\overrightarrow{V_{ya}})$ are calculated by:

$$(x1 - W/2) = f_x \times \tan(\theta'/2) = f_x \times u; // \qquad \text{equation (3a)}$$

$$(y1 - H/2) = f_y \times \tan(\varphi'/2) = f_x \times v; // \qquad \text{equation (3b)}$$

According to the equations (2a) and (3a), calculate $u=\tan(\theta'/2)=(x1-W/2)/f_x$. According to the equations (2b) and (3b), calculate $v=\tan(\varphi'/2)=(y1-H/2)/f_y$.

Figure 4C:
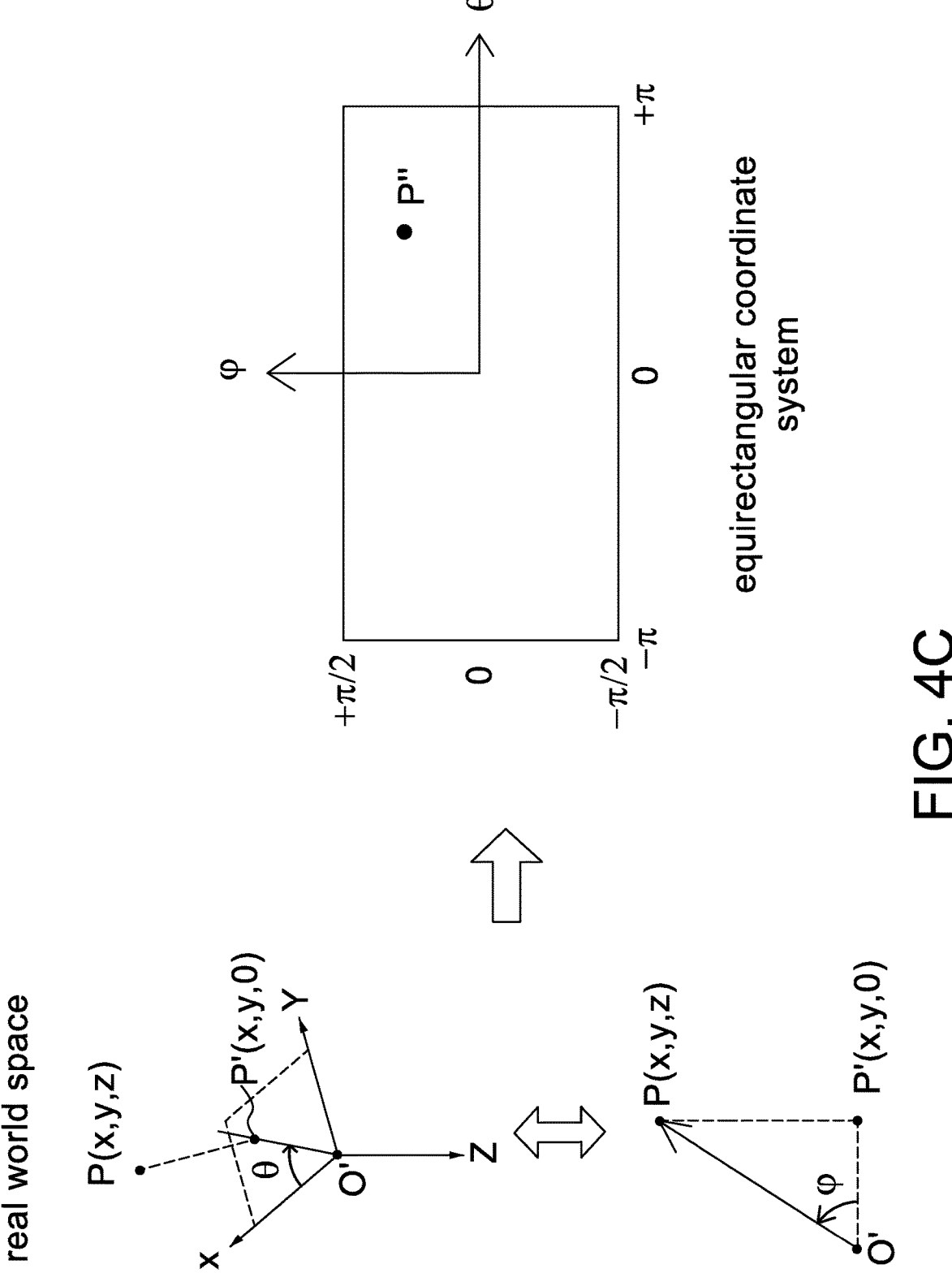

A point normalized vector $\overrightarrow{Aq}$ for a pixel q(u,v) on the normalized plane relative to the viewpoint A in FIG. 4B is defined as $\overrightarrow{Aq}=\overrightarrow{V_{za}}+u\times\overrightarrow{V_{xa}}+v\times\overrightarrow{V_{ya}}$. Please note that the distance between the normalized plane and the viewpoint A is 1 (equal to the coefficient of $\overrightarrow{V_{za}}$), and the image plane is parallel to the normalized plane. Since the point P is on the unit sphere, then $\|\overrightarrow{O'P}\|^2=(\overrightarrow{O'A}+\overrightarrow{AP})^2=(\overrightarrow{O'A}+r\overrightarrow{Aq})^2=1$, where r is a variable. To solve the r values, we derive as follows: $r^2(\overrightarrow{Aq}\cdot\overrightarrow{Aq})+2r(\overrightarrow{O'A}\cdot\overrightarrow{Aq})+(\overrightarrow{O'A}\cdot\overrightarrow{O'A}-1)=0$. Given that $a=\overrightarrow{Aq}\cdot\overrightarrow{Aq}$, $b=\overrightarrow{O'A}\cdot\overrightarrow{Aq}$, $c=(\overrightarrow{O'A}\cdot\overrightarrow{O'A}-1)$ and $\Delta=b\times b-a\times c$, the two roots are given as $r_0=(-b+\sqrt{\Delta})/a$ and $r_1=(-b-\sqrt{\Delta})/a$. Next, the following program codes are provided to calculate the r values: $r=r_0\geq 0$? $r_0$: $r_1\geq 0$? $r_1$: error. Thus, the coordinates of point P(x,y,z) on the surface of unit sphere are determined when the r value is determined. Since the panorama camera O may be rotated without translational movement, calculate the following dot products to determine corresponding coordinates (x',y',z') for point P: $x'=\overrightarrow{V_{xc}}\cdot\overrightarrow{O'P}$; $y'=\overrightarrow{V_{yc}}\cdot\overrightarrow{O'P}$; $z'=\overrightarrow{V_{zc}}\cdot\overrightarrow{O'P}$, where three coordinate axis unit vectors $(\overrightarrow{V_{xc}},\overrightarrow{V_{yc}},\overrightarrow{V_{zc}})$ define the orientation of the panorama camera O. Because $z'=\cos\varphi\cos\theta$, $x'=\cos\varphi\sin\theta$ and $y'=\sin\varphi$, we can determine corresponding spherical coordinates $(1, \theta, \varphi)$. The spherical projection is then mapped to an EQT coordinate system and thus the point P(x,y,z) in spherical coordinate system corresponds to the point $P''(\theta,\varphi)$ in EQT coordinate system, where $\theta$ denotes the angle between the x-axis and the vector $\overrightarrow{O'P}$ on x-y plane and $\varphi$ denotes the angle between x-y plane and the vector $\overrightarrow{O'P}$, as shown in FIG. 4C, Finally, according to the EQT coordinates $P''(\theta,\varphi)$, texture map the texture data (or color values) from the decoded EQT panoramic image using any appropriate method (such as nearest-neighbour interpolation, bilinear interpolation or trilinear interpolation) to generate a pixel value for the point p(x1,y1) in the view image, where $0 <= x1 <= (W-1)$ and $0 <= y1 <= (H-1)$. In this manner, after the texture color values of all selected pixels in the view image are sequentially obtained, the view image is formed and then displayed by the display unit 212.

Figure 5A:
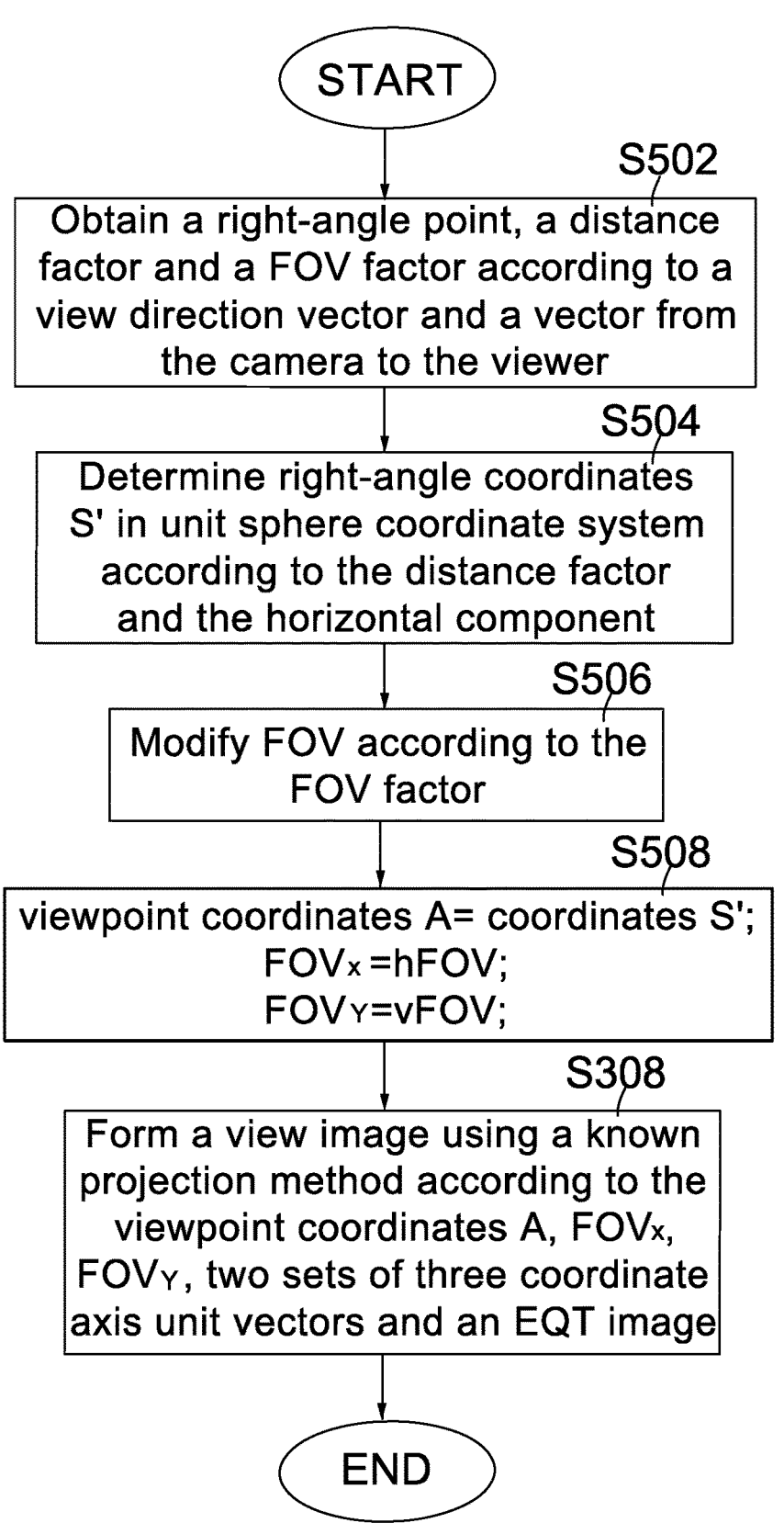
FIG. 5A is a flow chart of image projection method for virtual tour according to another embodiment of the invention.

FIG. 5A is a flow chart of image projection method for virtual tour according to another embodiment of the invention. Hereinafter, all steps of the image processing method (performed by the processor 213) are described with reference to FIGS. 5A-5C. It is assumed that (1) there are a panorama camera and a viewer in a room/space; (2) the viewer wears or carries a local device 210; (3) a storage medium 214 of the local device 210 stores a decoded EQT panoramic image derived from the panorama camera; (4) a display unit 212 of the local device 210 is ready to display a view image once the final step S308 is completed; and (5) a view direction vector is $\overrightarrow{V_{za}}$ that is one of three coordinate axis unit vectors $(\overrightarrow{V_{xa}}, \overrightarrow{V_{ya}}, \overrightarrow{V_{za}})$ that defines the orientation of the image plane in FIGS. 4A-4B. In an alternative embodiment, the view direction vector is a scalar multiple of $\overrightarrow{V_{za}}$.

Step S502: Obtain a distance factor $\alpha$, a FOV factor $\beta$ and a right-angle point S according to a view direction vector $\overrightarrow{V_{za}}$ and a vector $\overrightarrow{OE}$ from a panorama camera O to a viewer E in real world space. For example, as shown on the left side of FIG. 5B, according to the view direction vector $\overrightarrow{V_{za}}$ and the vector $\overrightarrow{OE}$, the vertical component v is calculated according to the dot product of the view direction vector $\overrightarrow{V_{za}}$ and the vector $\overrightarrow{OE}$ by the equation: $v=\overrightarrow{OE} \cdot \overrightarrow{V_{za}}$ and the horizontal component h is calculated according to the distance between the panorama camera O and the right-angle point S by the equation: $h=\|\overrightarrow{OS}\|=\|\overrightarrow{OE}-v\overrightarrow{V_{za}}\|$. The vertical component v and the horizontal component h are orthogonal and intersect at the right-angle point S.

Figure 5B:
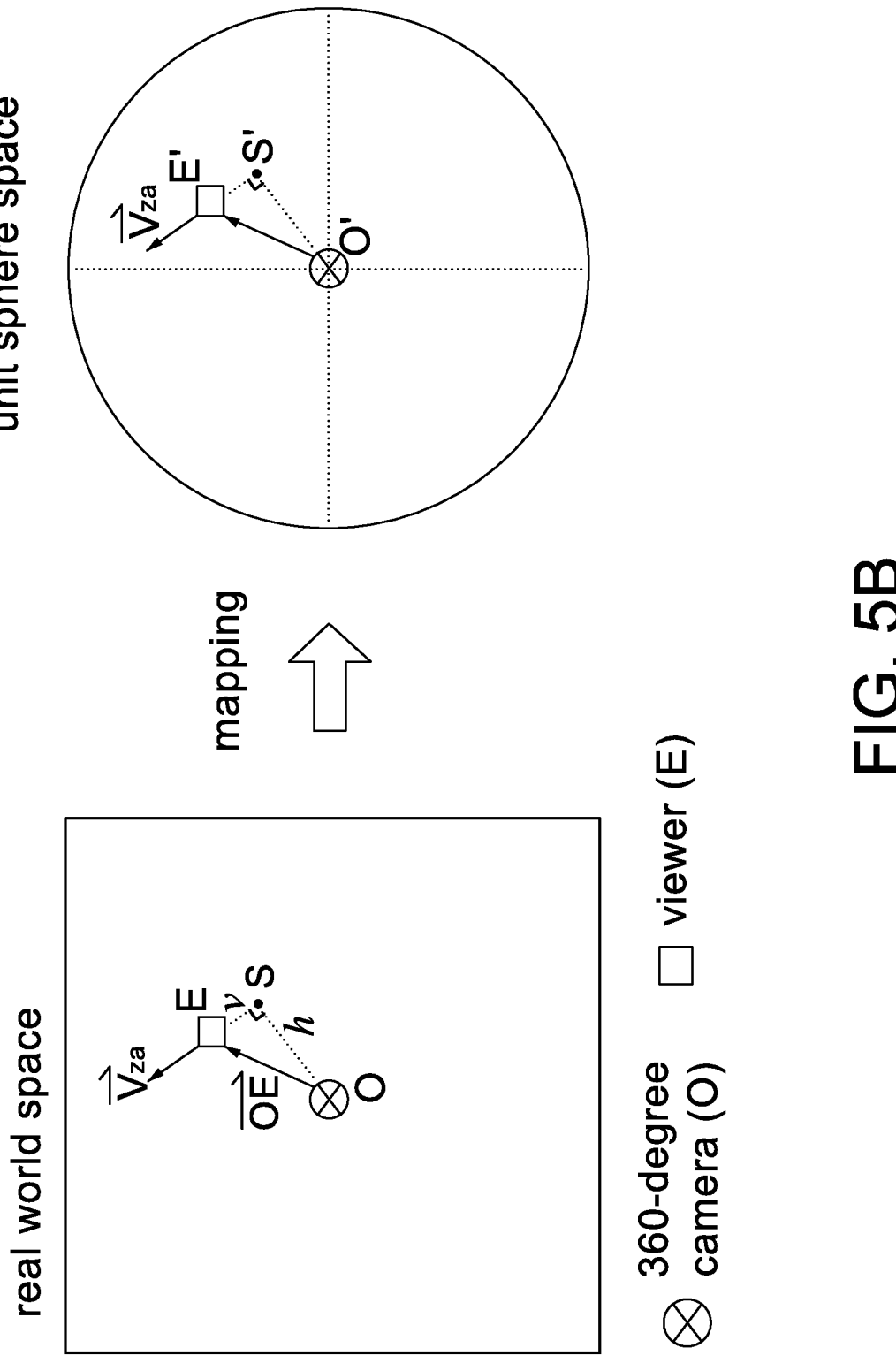
FIG. 5B shows a second mapping relationship between a real word space and a unit sphere space for a panorama camera and a viewer.
Figure 5C:
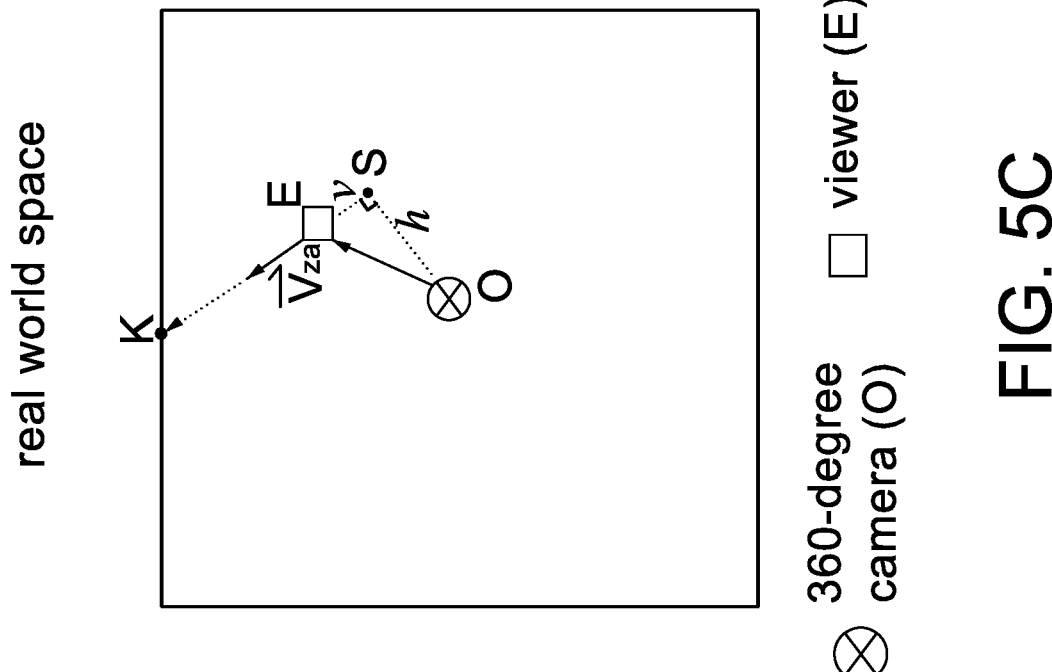
FIG. 5C is another example showing different distances of a viewer E, a viewpoint S and a point K from the panorama camera in a room.

Then, calculate the distance factor $\alpha$ according to the horizontal component h by one of the following the approaches B1~B3. For Approach B1, calculate the distance factor $\alpha=\rho \times (1-e^{-h})$, where $0 < \rho < 1$. For Approach B2, calculate an average distance Rad from the camera to the multiple walls in a space/room and then calculate the distance factor $\alpha=h/Rad$; for example, $$Rad = \sqrt[3]{\left(\sum_{i=0}^{i=7} d_i^3\right)/8},$$

where $d_i$ indicates distances of different walls from the camera O in a room/space of FIG. 3C. For Approach B3, as shown in FIG. 5C, calculate the distance factor $\alpha=h/Rad$. Approaches B2~B3 impose the upper limitation on the distance factor $\alpha$. That is, if the distance factor $\alpha$ is greater than a maximum value of aHigh, then $\alpha=aHigh$.

Next, calculate the FOV factor $\beta$ according to the vertical component v by the following the approaches B1~B3. For Approach B1, the following program codes are provided to calculate the FOV factor $\beta$:

$$\beta = v > 0? (\lambda_1 + \lambda_2 \times e^{-|v|}):(\lambda_3 - \lambda_4 \times e^{-|v|}), \text{ where,}$$

$$\lambda_1 + \lambda_2 = 1 \text{ and } \lambda_3 - \lambda_4 = 1.$$

In an embodiment, given that $\lambda_1=0.5$, $\lambda_2=0.5$, $\lambda_3=2$ and $\lambda_4=1$, then the $\beta$ value is in the range of 0.5 to 2.

For Approach B2, the following program codes are provided to calculate the FOV factor $\beta$:

$$\beta = v > 0?(1 - |v|/Rad):(1 + |v|/Rad); \text{ if } (\beta < \beta Low)\beta = \beta Low; //$$

$$\text{the } \beta \text{ value is in the range of } \beta Low \text{ to } \beta High \text{ if}$$

$$(\beta > \beta High)\beta = \beta High;$$

For Approach B3, calculate a distance $D'=\|\overrightarrow{EK}\|$ from the viewer E to a point K on the right wall as shown in FIG. 5C and then calculate the FOV factor $\beta=(v/(v+D'))$, where $\overrightarrow{V_{za}}$ and $\overrightarrow{EK}$ have the same direction. Approach B3 imposes the upper limitation on the FOV factor $\beta$. That is, if the FOV factor $\beta$ is greater than a maximum value of $\beta High$, then $\beta=\beta High$.

Step S504: Determine coordinates of a point S' in unit sphere coordinate system corresponding to the right-angle point S according to the vector $\overrightarrow{OS}$, the horizontal component h and the distance factor $\alpha$. Referring to FIG. 5B, converting coordinates $O(x_0, y_0, z_0)$ of the camera O in world coordinate system into the origin $O'(0, 0, 0)$ in unit sphere coordinate system is prerequisite for mapping the coordinates. Then, the coordinates of the point S' in unit sphere coordinate system corresponding to the right-angle point S are calculated by $\overrightarrow{O'S'}=O'+\alpha \times \overrightarrow{OS}/h$.

Step S506: Modify a default FOV according to the FOV factor $\beta$. The default FOV with a HFOV value and a VFOV value is modified according to the $\beta$ value to obtain a current horizontal field of view (hFOV) and a current vertical FOV(vFOV) as follows:

$$hFOV = HFOV \times \beta; vFOV = VFOV \times \beta.$$

Thus, the hFOV value and the vFOV value are determined by the FOV factor $\beta$.

Step S508: Set coordinates of a viewpoint A in unit sphere coordinate system to the coordinates of the right-angle point S', a horizontal field of view $(FOV_x)$ to the hFOV value, a vertical $FOV(FOV_y)$ to the vFOV value. That is, the coordinates of the viewpoint A are equal to the coordinates of the right-angle point S' in unit sphere coordinate system;

$$FOV_x = hFOV; FOV_Y = vFOV.$$

Since the final Step S308 has been detailed in connection with FIG. 3A, its description is omitted herein.

Figure 1:
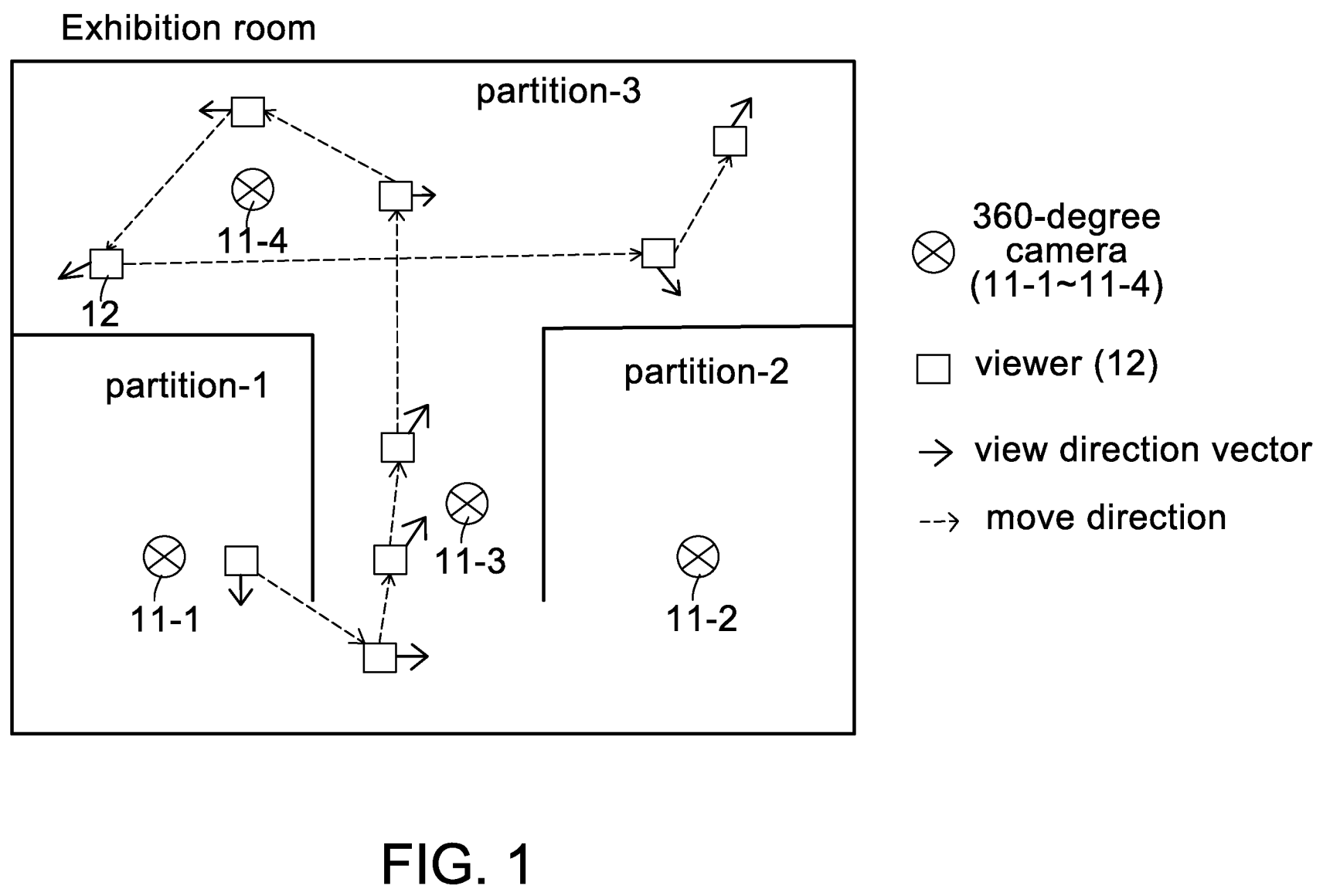
Figure 6:
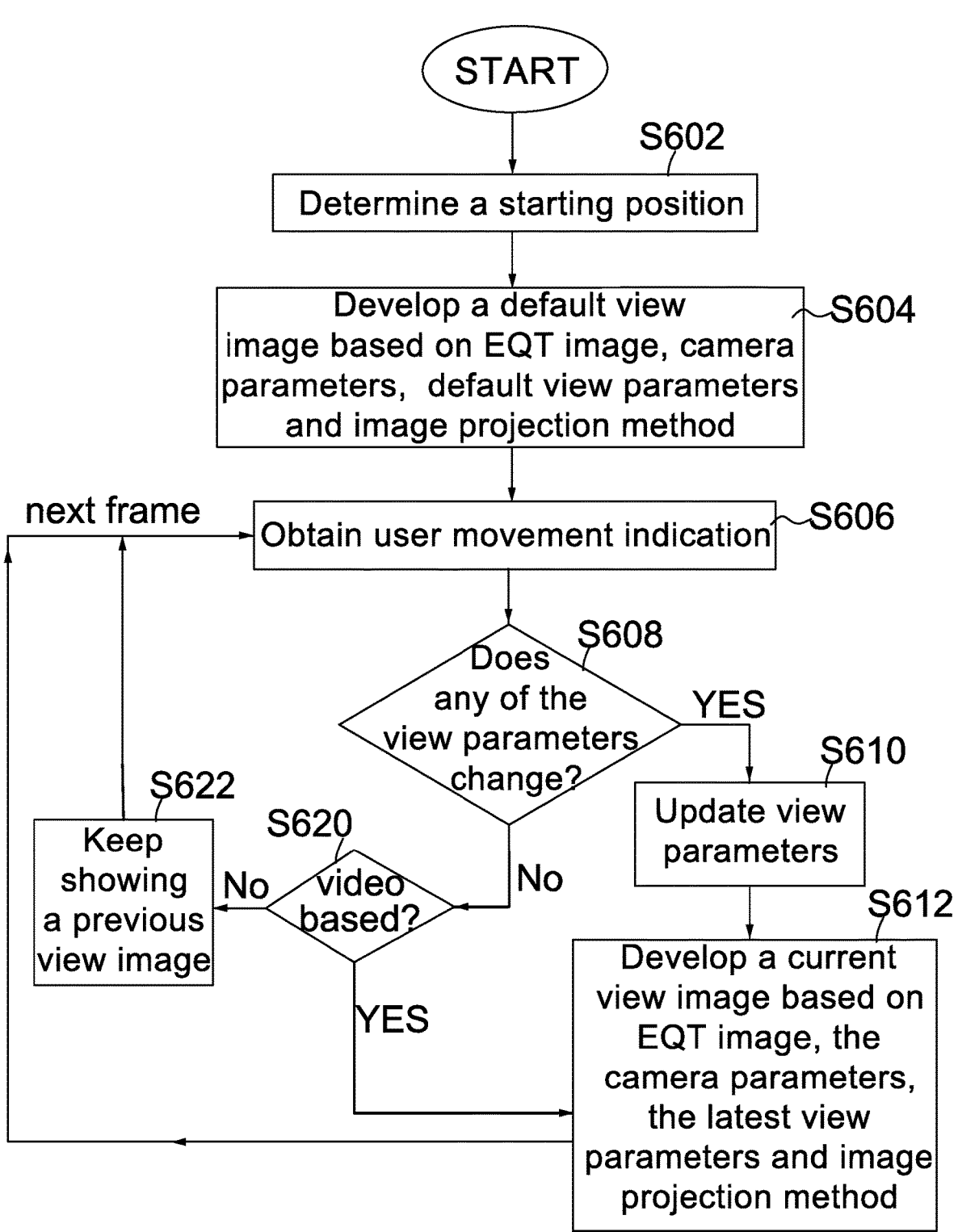
FIG. 6 is a flow chat of an image processing method for virtual tour according to the invention.

FIG. 6 is a flowchart of an image processing method for virtual tour according to the invention. Hereinafter, all steps of the image processing method (performed by the processor 213) are described with reference to FIGS. 1, 2B and 6. Assuming that a viewer/user carries a six-degree-of-freedom (6-DoF) virtual reality (VR) headset (not shown) as the local device 210 and the display unit 212 of the local device 210 shows multiple view images for the virtual tour in the exhibition room starts at the partition-1 in FIG. 1. As well known in the art, a total of six degrees of freedom describes every possible movement of an object: three for rotational movement around the x, y, and z axes (also known as pitch, yaw, and roll) and three for translational movement along those axes; the 6-DoF VR headset includes built-in inertial measurement unit (IMU) sensors with 3-axis gyros, 3-axis accelerometers and 3-axis magnetometers (not shown). As the user/viewer moves, the output data from the IMU sensors are fed into the processor 213 which computes the orientation and the position of the 6-DoF VR headset using any known algorithm/method to produce corresponding three coordinate axis unit vectors $(\overrightarrow{V_{xa}}, \overrightarrow{V_{ya}}, \overrightarrow{V_{za}})$ for an image plane (containing a view image as shown in FIG. 4A-4B) and a current position $E(x_e, y_e, z_e)$ of a viewer in real time. Thus, the orientations and the positions (i.e., rotational and translational motion) of the 6-DoF VR headset are allowed to be tracked.

Step S602: Determine a starting position for the display unit 212 to start displaying. The starting position is set to the current position of the panorama camera 11-1 in real world coordinate system in the partition-1 in FIG. 1. Thus, based on the starting position, the local device 210 carried by the viewer retrieves a corresponding encoded video bitstream from the server 250 through the internet 240, decodes the encoded video bitstream into a decoded EQT panoramic image and then stores the decoded EQT panoramic image in the storage medium 214.

Step S604: Develop a default view image using one of the image projection methods in FIG. 3A and FIG. 5A based on the decoded EQT panoramic image, camera parameters and default view parameters, and then cause the display unit 212 to show the default view image. In an embodiment, the camera parameters include, but are not limited to, a current position $O(x_0, y_0, z_0)$ of the panorama camera 11-1 in real world coordinate system, three coordinate axis unit vectors $(\overrightarrow{V_{xc}}, \overrightarrow{V_{yc}}, \overrightarrow{V_{zc}})$ for orientation of the panorama camera 11-1 in real world coordinate system and an estimated radius Rad of the panorama camera 11-1 relative to multiple walls in the partition-1. Here, the estimated radius Rad is optional and described in connection with FIG. 3C. The camera parameters are determined in advance and stored in the virtual tour system 200A/B. The view parameters include, but are not limited to, a current position $E(x_e, y_e, z_e)$ of a viewer in real world coordinate system, three coordinate axis unit vectors $(\overrightarrow{V_{xa}}, \overrightarrow{V_{ya}}, \overrightarrow{V_{za}})$ for an image plane (as shown in FIG. 4A-4B) in real world coordinate system, a HFOV value and a VFOV value. For example, during initialization, the HFOV value is set to 180 degrees, the VFOV value is set to 150 degrees, the current position of the viewer is set to the current position of the panorama camera 11-1, i.e., $E(x_e, y_e, z_e)=O(x_0, y_0, z_0)$; the three coordinate axis unit vectors for the image plane are set to the three coordinate axis unit vectors for the panorama camera 11-1, i.e., $(\overrightarrow{V_{xa}}, \overrightarrow{V_{ya}}, \overrightarrow{V_{za}})=(\overrightarrow{V_{xc}}, \overrightarrow{V_{yc}}, \overrightarrow{V_{zc}})$. Here, the unit vectors $(\overrightarrow{V_{xa}}, \overrightarrow{V_{ya}}, \overrightarrow{V_{za}})$ and $(\overrightarrow{V_{xc}}, \overrightarrow{V_{yc}}, \overrightarrow{V_{zc}})$ respectively define the orientations of the panorama camera 11-1 and the image plane in FIGS. 4A-4B.

Step S606: Obtain user movement indication. That is, the view parameters are received.

Step S608: Determine whether any of the view parameters is changed. For example, if the user/viewer moves, then the current position $E(x_e, y_e, z_e)$ of the viewer would be changed; the user/viewer may change the HFOV/VFOV value through a user interface of the web browser; the user/viewer may turn his head and then the output data from the IMU sensors in the 6-DoF VR headset are fed into the processor 213 which computes three corresponding coordinate axis unit vectors $(\overrightarrow{V_{xa}}, \overrightarrow{V_{ya}}, \overrightarrow{V_{za}})$ for the image plane in real time. The view parameters are subject to change/update according to the output data from the input unit 211 (e.g., the IMU sensors).

Step S610: Update the view parameters.

Step S612: Develop a current view image using one of the image projection methods in FIG. 3A and FIG. 5A based on the decoded EQT panoramic image, the camera parameters and the latest view parameters, and then cause the display unit 212 to show the current view image. Then, the flow returns to step S606 for the next frame.

Step S620: Determine whether it is a video-based scene. If YES, the flow goes to step S612; otherwise, the flow goes to step S622.

Step S622: Keep showing a previous view image by the display unit 212. Then, the flow returns to step S606 for the next frame.

The above embodiments and functional operations can be implemented in digital electronic circuitry, in tangibly-embodied computer software or firmware, in computer hardware, including the structures disclosed in this specification and their structural equivalents, or in combinations of one or more of them. The methods and logic flows described in FIGS. 3A, 5A and 6 can be performed by one or more computers executing one or more computer programs to perform their functions. The methods and logic flows in FIGS. 3A, 5A and 6 can also be performed by special purpose logic circuitry, e.g., an FPGA (field programmable gate array) or an ASIC (application-specific integrated circuit). Computers suitable for the execution of the one or more computer programs include, by way of example, can be based on general or special purpose processors or both, or any other kind of central processing unit. The storage medium 214 or computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image projection method for a virtual tour system receiving a panoramic image derived from a panorama camera and comprising a local device, the local device comprising a display unit, the method comprising steps of:
obtaining a distance factor in a range of 0 to 1 in unit sphere space according to coordinates of the panorama camera and a viewer in real world space;
obtaining mapping coordinates of a viewpoint related to the viewer in unit sphere space according to the distance factor and the coordinates of the viewer in real world space; and forming a view image to be displayed by the display unit according to the mapping coordinates of the viewpoint, wherein the step of obtaining the distance factor comprises: converting a distance d between the panorama camera and the viewer in real word space into the distance factor, wherein the viewpoint is equivalent to the viewer, and wherein the step of converting comprises calculating the distance factor $\alpha$ by an equation: $\alpha=\rho\times(1-e^{-d})$, where $0<\rho<1$.

2. An image projection method for a virtual tour system receiving a panoramic image derived from a panorama camera and comprising a local device, the local device comprising a display unit, the method comprising steps of:

obtaining a distance factor in a range of 0 to 1 in unit sphere space according to coordinates of the panorama camera and a viewer in real world space;

obtaining mapping coordinates of a viewpoint related to the viewer in unit sphere space according to the distance factor and the coordinates of the viewer in real world space; and forming a view image to be displayed by the display unit according to the mapping coordinates of the viewpoint, wherein the step of obtaining the distance factor comprises converting a distance d between the panorama camera and the viewer in real word space into the distance factor, wherein the viewpoint is equivalent to the viewer, and wherein the step of converting comprises: calculating the distance factor $\alpha$ by an equation: $\alpha=d/Rad$, where Rad denotes an average distance from the panorama camera to multiple walls of a room in real world space.

3. An image projection method for a virtual tour system receiving a panoramic image derived from a panorama camera and comprising a local device, the local device comprising a display unit, the method comprising steps of:

obtaining a distance factor in a range of 0 to 1 in unit sphere space according to coordinates of the panorama camera and a viewer in real world space;

obtaining mapping coordinates of a viewpoint related to the viewer in unit sphere space according to the distance factor and the coordinates of the viewer in real world space; and forming a view image to be displayed by the display unit according to the mapping coordinates of the viewpoint, wherein the step of obtaining the distance factor comprises converting a distance d between the panorama camera and the viewer in real word space into the distance factor, and wherein the viewpoint is equivalent to the viewer, wherein the step of converting comprises:

calculating a distance D between the panorama camera O and a point K on a wall of a room in real world space; and calculating the distance factor $\alpha$ by an equation: $\alpha=d/D$, wherein vectors $\overrightarrow{OE}$ and $\overrightarrow{OK}$ have the same direction, and E denotes coordinates of the viewer in real world space.

4. The image projection method according to claim 3, wherein the step of obtaining the mapping coordinates comprises:

calculating the mapping coordinates according to the distance factor, the distance d and the coordinates of the viewer in real world space.

5. An image projection method for a virtual tour system receiving a panoramic image derived from a panorama camera and comprising a local device, the local device comprising a display unit, the method comprising steps of:

obtaining a distance factor in a range of 0 to 1 in unit sphere space according to coordinates of the panorama camera and a viewer in real world space;

obtaining mapping coordinates of a viewpoint related to the viewer in unit sphere space according to the distance factor and the coordinates of the viewer in real world space; and forming a view image to be displayed by the display unit according to the mapping coordinates of the viewpoint, wherein the step of obtaining the distance factor comprises:

determining a vertical component and a horizontal component according to a view direction vector and a vector from the panorama camera to the viewer in real world space;

wherein the vertical component and the horizontal component are orthogonal and intersect at the viewpoint; and wherein the view direction vector is orthogonal to the view image.

6. The image projection method according to claim 5, wherein the step of obtaining the distance factor further comprises:

determining the distance factor according to the horizontal component.

7. The image projection method according to claim 6, wherein the step of determining the distance factor comprises:

calculating the distance factor $\alpha$ according to the horizontal component h by an equation: $\alpha=\rho\times(1-e^{-h})$, where $0<\rho<1$.

8. The image projection method according to claim 6, wherein the step of determining the distance factor comprises:

calculating the distance factor $\alpha$ according to the horizontal component h and an average distance Rad from the panorama camera to multiple walls of a room in real world space by an equation: $\alpha=h/Rad$.

9. The image projection method according to claim 5, wherein the step of obtaining the distance factor further comprises:

determining a FOV factor according to the vertical component.

10. The image projection method according to claim 9, wherein the step of determining the FOV factor comprises:

when the vertical component v is greater than zero, calculating the FOV factor $\beta$ by an equation: $\beta=(1_1+1_2\times e^{-|v|})$;

when the vertical component v is less than or equal to zero, calculating the FOV factor $\beta$ by an equation: $\beta=(1_3-1_4\times e^{-|v|})$;

wherein $1_1+1_2=1$ and $1_3-1_4=1$.

11. The image projection method according to claim 9, wherein the step of determining the FOV factor comprises:

when the vertical component v is greater than zero, calculating the FOV factor $\beta$ by an equation: $\beta=(1-|v|/Rad)$;

when the vertical component v is less than or equal to zero, calculating the FOV factor $\beta$ by an equation: $\beta=(1+|v|/Rad)$;

wherein Rad denotes an average distance from the panorama camera to multiple walls of a room in real world space.

12. The image projection method according to claim 9, wherein the step of determining the FOV factor comprises:

calculating the FOV factor β by an equation: $\beta=v/(v+D)$;
wherein D denotes a distance between the viewer E and
a point K on a wall of a room in real world space; and wherein $\overrightarrow{EK}$ and the view direction vector have the same
direction.

13. The image projection method according to claim 5,
wherein the step of determining the vertical component and
the horizontal component comprises:

calculating the vertical component according to a dot
product of the view direction vector and the vector
from the panorama camera to the viewer in real world
space; and calculating the horizontal component according to a dis-
tance between the panorama camera and the viewpoint
in real world space.

14. The image projection method according to claim 5,
wherein the step of obtaining the mapping coordinates
comprises:

determining the mapping coordinates according to the
coordinates of the viewpoint in real world space, the
distance factor and the horizontal component.

15. The image projection method according to claim 9,
further comprising:

modifying a default FOV according to the FOV factor to
obtain a current FOV.

16. An image projection method for a virtual tour system
receiving a panoramic image derived from a panorama
camera and comprising a local device, the local device
comprising a display unit, the method comprising steps of:

obtaining a distance factor in a range of 0 to 1 in unit
sphere space according to coordinates of the panorama
camera and a viewer in real world space;

obtaining mapping coordinates of a viewpoint related to
the viewer in unit sphere space according to the dis-
tance factor and the coordinates of the viewer in real
world space; and forming a view image to be displayed by the display unit
according to the mapping coordinates of the viewpoint, wherein the step of forming comprises: determining color
values of multiple selected pixels in the view image
according to the mapping coordinates of the viewpoint,
a field of view (FOV), a first set of three coordinate axis
unit vectors and a second set of three coordinate axis
unit vectors;

wherein the first and the second sets of three coordinate
axis unit vectors respectively the orientations of the
view image and the panorama camera.

17. The image projection method according to claim 16,
wherein the step of determining the color values comprises:

for each selected pixel in the view image, calculating a point normalized vector according to the first
set of three coordinate axis unit vectors, coordinates of
the selected pixel in the view image and the FOV;

calculating coordinates of a projection point on a unit
sphere according to the mapping coordinates of the
viewpoint and the point normalized vector; and determining the color values of the selected pixel by
texture sampling the panoramic image according to the
coordinates of the projection point and the second set of
three coordinate axis unit vectors;

wherein at least one of the FOV, the first set of three
coordinate axis unit vectors and the coordinates of the
viewer in real world space is updated according to input
data from an input unit of the local device.

* * * * *